United States Patent
Busaba et al.

(10) Patent No.: US 9,514,006 B1
(45) Date of Patent: Dec. 6, 2016

(54) TRANSACTION TRACKING WITHIN A MICROPROCESSOR

(71) Applicant: International Business Machines Corporation, Armonk, NY (US)

(72) Inventors: Fadi Y. Busaba, Poughkeepsie, NY (US); Michael Karl Gschwind, Chappaqua, NY (US); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/971,600

(22) Filed: Dec. 16, 2015

(51) Int. Cl.
    *G06F 11/00* (2006.01)
    *G06F 11/14* (2006.01)
    *G06F 11/07* (2006.01)

(52) U.S. Cl.
    CPC ....... *G06F 11/1469* (2013.01); *G06F 11/0745* (2013.01); *G06F 11/1451* (2013.01); *G06F 11/1474* (2013.01); *G06F 2201/805* (2013.01); *G06F 2201/87* (2013.01)

(58) Field of Classification Search
    CPC .............. G06F 11/1469; G06F 11/1451; G06F 11/1474; G06F 11/0745; G06F 2201/805; G06F 2201/87
    USPC ........................................ 714/19, 15, 18, 20
    See application file for complete search history.

(56) References Cited

U.S. PATENT DOCUMENTS

| | | | |
|---|---|---|---|
| 6,349,361 B1 | 2/2002 | Altman et al. | |
| 6,732,208 B1 | 5/2004 | Alsaadi et al. | |
| 7,636,829 B2 | 12/2009 | Hertzberg et al. | |
| 8,327,089 B2 | 12/2012 | Meyer et al. | |
| 2008/0005504 A1 | 1/2008 | Barnes et al. | |
| 2008/0162990 A1* | 7/2008 | Wang | G06F 9/3863 714/19 |
| 2008/0244354 A1 | 10/2008 | Wu et al. | |

(Continued)

OTHER PUBLICATIONS

Jacobi et al., "Transactional Memory Architecture and Implementation for IBM System z," 2012 IEEE/ACM 45th Annual International Symposium on Microarchitecture (MICRO 45), Dec. 2012, pp. 25-36, Vancouver, British Columbia, Canada, IEEE Computer Society Conference Publishing Services (CPS). DOI: 10.1109/MICRO.2012.12.

McDonald, A., "Architectures for Transactional Memory," Doctor of Philosophy Dissertation, Stanford University, Jun. 2009, 161 pages.

Ni et al., "Open Nesting in Software Transactional Memory," PPoPP'07: Proceedings of the 12th ACM SIGPLAN symposium on Principles and practice of parallel programming, Mar. 14-17, 2007, pp. 68-78, ISBN: 978-1-59593-602-810710003, Copyright © 2007 ACM. DOI: 10.1145/1229428.1229442.

(Continued)

*Primary Examiner* — Joseph D Manoskey
(74) *Attorney, Agent, or Firm* — Nathan M. Rau

(57) ABSTRACT

Embodiments of the present disclosure include a method, a system, and a computer program product for processing multiple transactions within a transaction execution environment. The transaction execution environment includes a first transaction that is assigned a first transaction identification number, and a second transaction that is assigned a second transaction identification number which process on a processor. The processor processes the first transaction and the second transaction on one or more threads of the processor. A first rollback save state is created for the first transaction and a second rollback save state is created for the second transaction. An interference is detected prior to ending a transaction, between the processing of the first transaction and the processing of the second transaction. In response to the interference, the second transaction is rolled back to the second rollback save state.

20 Claims, 10 Drawing Sheets

(56) References Cited

U.S. PATENT DOCUMENTS

| | | |
|---|---|---|
| 2009/0138890 A1 | 5/2009 | Blake et al. |
| 2010/0162247 A1* | 6/2010 | Welc .................. G06F 9/466 718/101 |
| 2011/0029490 A1* | 2/2011 | Agarwal ............... G06F 9/467 707/684 |
| 2012/0005530 A1 | 1/2012 | Marathe et al. |
| 2012/0179875 A1 | 7/2012 | Saha et al. |
| 2012/0210162 A1 | 8/2012 | Gara et al. |
| 2012/0304002 A1* | 11/2012 | Chen .................... G06F 9/467 714/15 |
| 2013/0046937 A1 | 2/2013 | Heller, Jr. |
| 2013/0151791 A1* | 6/2013 | Diestelhorst ............ G06F 11/00 711/147 |

OTHER PUBLICATIONS

IBM, "z/Architecture: Principles of Operation," SA22-7832-09, Tenth Edition, Sep. 2012, 1568 pages.

Intel, "Intel® Architecture Instruction Set Extensions Programming Reference," Reference 319433-012A, Feb. 2012, 604 pages.

Mak et al., "IBM System z10 processor cache subsystem microarchitecture," IBM Journal of Research and Development, vol. 53, No. 1, Paper 2, 2209, pp. 1-12.

* cited by examiner

TRANSACTION TRACKING WITHIN A MICROPROCESSOR

BACKGROUND

Aspects of the present disclosure relate to transactions in a microprocessor, and more specifically, to tracking transactions in a microprocessor. The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sublinear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion, simply TM) have been introduced, wherein a group of instructions—called a transaction—operate in an atomic manner on a data structure in memory, as viewed by other central processing units (CPUs) and the I/O subsystem (atomic operation is also known as "block concurrent" or "serialized" in other literature). The first transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

SUMMARY

Embodiments of the disclosure provide a method, system, and computer program product for processing multiple transactions within a transaction execution environment. The method, system, and computer program product determine an interference between one or more transactions and rollback at least one of the one or more transactions upon a determination of interference between the one or more transactions.

An embodiment provides a method for processing multiple transactions within a transaction execution environment. The transaction execution environment includes a first transaction that is assigned a first transaction identification number, and a second transaction that is assigned a second transaction identification number. The processor performs the processing of the first transaction and the second transaction on one or more threads of the processor. A first rollback save state is created for the first transaction relating the first transaction to the first transaction identification number and a second rollback save state is created for the second transaction relating the second transaction to the second transaction identification number. An interference is detected prior to ending a transaction, between the processing of the first transaction and the processing of the second transaction. In response to the interference, the second transaction is rolled back to the second rollback save state.

Another embodiment provides a system for processing multiple transactions within a transaction execution environment. The system includes a memory, a processor device, and an operating system that is communicatively coupled to the memory and the processor device. The memory of the transaction execution environment is configured to store one or more data objects, and one or more rollback save states. The operating system of the transaction execution environment is configured to process a first transaction that is assigned a first transaction identification number, and a second transaction that is assigned a second transaction identification number. The operating system is configured to process the first transaction and the second transaction on one or more threads of the processor. The operating system is configured to create a first rollback save state for the first transaction and a second rollback save state for the second transaction. When there is a conflict between transactions one or both are aborted and rolled back to their save state.

Yet another embodiment provides a computer program product for processing multiple transactions within a transaction execution environment. The computer program product of the transaction execution environment is configured to process a first transaction that is assigned a first transaction identification number, and a second transaction that is assigned a second transaction identification number. The computer program product is configured to process the first transaction and the second transaction on one or more threads of the processor. The computer program product is configured to create a first rollback save state for the first transaction and a second rollback save state for the second transaction. The computer program product is configured to detect an interference between the processing of the first transaction and the processing of the second transaction by maintaining a list of cache lines touched by each transaction. The computer program product is configured to rollback the second transaction to the second rollback save state.

The above summary is not intended to describe each illustrated embodiment or every implementation of the present disclosure.

BRIEF DESCRIPTION OF THE DRAWINGS

One or more aspects of the present disclosed embodiments are particularly pointed out and distinctly claimed as examples in the claims at the conclusion of the specification. The foregoing and other objects, features, and advantages of the disclosed embodiment are apparent from the following detailed description taken in conjunction with the accompanying drawings.

Figure 1:
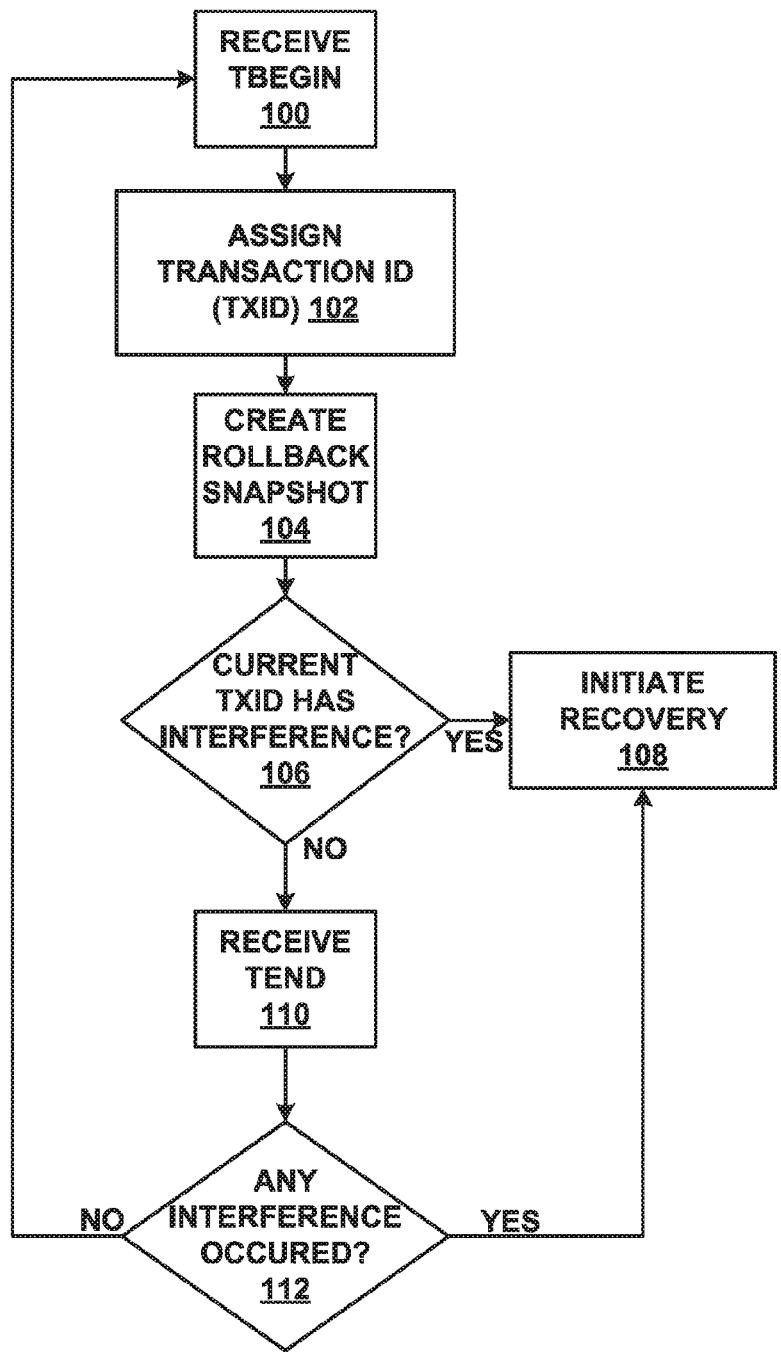
FIG. 1 depicts a flowchart for assigning transaction IDs and associating rollback information that is recovered in the event of interference, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relates to processing multiple transactions on a single microprocessor, and more specifically to determining rollbacks of transactions based on interferences. One or more transactions may be processing on a first processor of a transaction execution environment, wherein interferences may be determined based on the transactions being processed. The first processor may be a multi-threaded processor wherein one or more transactions may process on a first thread while one or more other transactions may process on a second thread. The transactions may be assigned transaction identification numbers to identify individual transactions and associate speculative transactional memory state associated thereto during the processing of the transaction. Rollback information may be created of the transaction such that if an interference is detected, then the transaction may be aborted and rolled back to the beginning of the transaction using the rollback information.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor could be packaged on a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes, which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT

CPUID

PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

In order to track and enable concurrent transactions in a system, instructions are grouped into transactions, representing an atomic group of instructions for which (both read and write) memory accesses appear to occur in their entirety and simultaneously. A memory access may be associated with a transaction. A transaction may be a read and/or write memory access within a computer. Memory systems that utilize transactions may be transactional memory systems. Transactional memory may be an approach to parallel programming, which may run numerous memory instructions simultaneously.

The transaction execution environment may include a first transaction that is assigned a first transaction identification number, and a second transaction that is assigned a second transaction identification number. The assignment of the transaction may occur by a processor during execution of the transaction with a begin instruction. Transaction identification numbers may be unique per processor. The processor may process transactions on one or more threads of the processor. The transactions may include first transaction and the second transaction. A first rollback save state may be created for the first transaction and a second rollback save state may be created for the second transaction. An interference may be detected between the first transaction and the second transaction. For example, if a write request from another transaction or from any external source requests a cache line in a transaction's footprint, then the transaction is aborted and a rollback takes place. This interference checking is a dynamic runtime check in the processor's cache directory where each line has an associated transaction identifier.

In various embodiments, to manage numerous simultaneous transactions, a transaction identification (TXID) may be generated and assigned to each transaction within the memory access of the computer. Additionally, instructions within a transaction may be marked with TXIDs. By marking the instructions of a transaction with the TXID of the transaction, the computer may individually track the group of instructions that make up a transaction. By assigning TXIDs, a processor may track multiple transactions concurrently, according to various embodiments. A transaction ID may be assigned to memory accesses of a transaction for individual control and tracking. Transaction IDs may be maintained with speculative transactional updates.

According to various embodiments, when a transaction is initiated, a TXID is assigned, and rollback information may be created for the transaction. The rollback information created may include a saved state that the computer may revert to, sometimes referred to as a "rollback snapshot." The rollback information records, amongst others, the address of the transaction start (TBEGIN), as well as the state of registers that are to be restored in the case of a rollback.

When interference is detected with a transaction, a rollback may be performed for a transaction. Embodiments may use the term interference, which may include an operation when two or more transactions, or a transaction and a memory access outside a transaction (which may be treated as a single instruction transactions, and may, or may not, be assigned a transaction ID) are operating on the same data object or are otherwise in conflict with each other. According to various embodiments, a rollback may cause a transaction to revert back to a previous saved state stored in the rollback information. After the rollback, the transaction may restart from the beginning or abort if a limit of the number of times retried is exceeded.

FIG. 1 depicts steps in processing the execution of transactions and including an ability to assign transaction IDs and create associate rollback information that may be recovered in the event of an interference, according to various in-order and out of sequence instruction execution embodiments. In operation 100, a central processing unit (CPU) may begin a transaction. The CPU may fetch instructions including the instructions of at least one transaction from memory to be processed. In operation 102, the CPU may assign a transaction ID (TXID) to the transaction when the begin of the transaction is encountered. For example, a CPU may assign a first TXID to a first transaction, and a second TXID to a second transaction.

In various embodiments, the second transaction may be an external request. Instead of being a transaction to be processed, the second transaction may be a request from an external CPU for a read operation. The second transaction may include reading a first data object (local cache or memory) currently being written or updated by the first transaction. The second transaction may be rejected to prevent the read operation from accessing incorrect or inaccessible data until the first transaction completes. Alternatively, the first transaction can be rolled backed, allowing the second transaction to complete, and then the first transaction may be restarted, which may display the data object including the information written by the first transaction. For example, a load operation (read) may be requested by a server of a bank for a home loan interest rate. If the load operation request occurs during an update to the loan interest rates and update includes home loans, then the load operation request may be rejected until the update has completed. Alternatively, the transaction of updating all interest rates can be rolled back, allowing the load to complete, and then restarting the interest rate update.

In operation 104, the CPU may create a rollback snapshot for the TXID. The rollback snapshot may be the state of the CPU before the transaction was initiated. The assigned TXID may allow the CPU to monitor the transaction and, if needed, rollback the transaction if an interference occurs. The rollback snapshot may be used as recovery state for the CPU in an event that interference has occurred. Occurring interference may be detected by a CPU that is configured to check for interferences between one or more transactions, or between one or more transactions and one or more memory accesses not associated to a transaction, within the CPU.

After starting the transaction, the CPU may start decoding and executing instructions of the transaction. Instructions in the transaction may be decoded and prepared for execution. In various embodiments, instructions may be executed out of order relative to each other, and out of order relative to instructions of other transactions (with another TXID) of the same CPU. TXIDs may be associated to transactions, and by associating TXIDs with instructions, events, and storage associated to said transaction with said TXID, to identify instructions, events, and storage of a transaction with the associated transaction's TXID, instructions which can cause events that must be associated with a specific transaction (e.g., memory accesses, and the TXEND instruction) may be executed out of order relative to each other. For comparison, only a single transaction may be active in a thread, so as to establish the transaction associated to instructions, storage, and events, thereby preventing instructions from multiple transactions to execute out of order relative to each other.

In operation 106, the CPU may determine if there is an interference with one or more current active transactions having currently active TXIDs and another transaction (or memory access instruction outside a transaction) after creating the rollback data. If there is interference, the CPU may initiate recovery using the rollback snapshot at operation 108 and revert the transaction to the state at the beginning of the transaction identified by a TXID using the rollback save state associated to the transaction with the identified TXID. If an interference has not occurred, then the CPU may complete the transaction by executing a transaction end (TEND) instruction for the transaction with the current (most recent) TXID at operation 110. For example, a first local transaction with a first TXID and a request from another processor, or another thread (corresponding to an access within a transaction, or not within a transaction) may be determined to have an interference. If the request from the remote processor interferes with the local transaction with a first TXID, then a recovery may be initiated using the rollback snapshot corresponding to the transaction with the first transaction ID (TXID).

In operation 108, upon the determination that the current transaction with a TXID has interfered with a remote request (interference determination logic specifies the transaction with which interference has occurred), a recovery may be initiated. The recovery may be initiated by performing a rollback of the present transaction using the rollback snapshot to revert the processor state to the state at the beginning of the present transaction specified by the TXID for which interference has been identified. For example, a request may interfere with a first transaction. In such a case, the CPU may then initiate a snapshot recovery and revert to the rollback save state corresponding to the transaction identified by the first TXID.

In operation 110, a TEND may be received to indicate the end of the current transaction with the current TXID by the CPU. The TEND may allow the transaction to be completed by the CPU. Receiving a TEND instruction in the instructions stream indicates the end of the transaction has been reached. Decode logic may place the TEND instruction associated to the TXID in the issue queue, and the CPU begins to complete the transaction. The TEND will execute when all instructions of the transaction of the identified TXID, as well as all previous instructions, have completed.

In operation 112, during the execution of the TEND instruction, the CPU determines if interference has occurred before completing the transaction. If the CPU does not detect any interference, then the CPU may complete the transaction and awaits the beginning of another transaction at operation 100. If the CPU detects interference, the CPU will initiate recovery using the rollback snapshot at operation 108 and revert the transaction to the previous rollback save state.

According to various embodiments, instructions of a transaction are associated with the TXID of their transaction and each instruction is individually associated with a TXID.

According to various embodiments, instructions specifying a memory access are associated with a TXID. By limiting the instructions that receive a TXID, the CPU may save time and processing power while retaining the control granted by fine-grain tracking.

In accordance with aspects of processing transaction begin and transaction end of transactions, in one embodiment, transactions must be initiated in-order relative to other transactions (e.g., corresponding to decoding the TBEGIN instruction), and must preferably complete in-order relative to the completion of other transactions. However, in accordance with the present disclosure, because instructions may be identified with their corresponding transactions using the TXID number, instructions of multiple transactions may execute out of order relative to each other.

In accordance with the present disclosure, transactional state, including rollback snapshots, speculative transactional state, read and write sets of a transaction are associated to the transaction ID of a transaction to which they correspond. When an interference occurs against at least one of a read and a write set, an interference is indicated in conjunction with the transaction TXID, so as to identify which transaction must be rolled back. Consequently, when a CPU rolls back a transaction, all subsequent, but non-preceding transactions may also be rolled back. When a transaction is rolled back, the state associated to a transaction is identified as idle, the TXID is identified as not active, speculative transaction state of the transaction is discarded, and read and write sets of the transaction identified with the TXID are cleared.

In accordance with at least one embodiment, the processor identifies the transactions to be cleared by issuing commands to invalidate the state associated to one or more TXIDs by placing the TXIDs on a control bus, or otherwise providing control signals indicating the TXIDs which are being invalidated. In another embodiment, a bit vector containing a bit for each TXID is used to invalidate transactions. For example, by setting a bit corresponding to a transaction with a given TXID to "1" to invalidate the corresponding transaction state in the various resource classes (read set, write set, speculative transaction state in the cache, snapshot memory, etc.), and by setting a bit corresponding to a transaction with a given TXID to "0" when the associate state is not to be invalidated.

Figure 2:
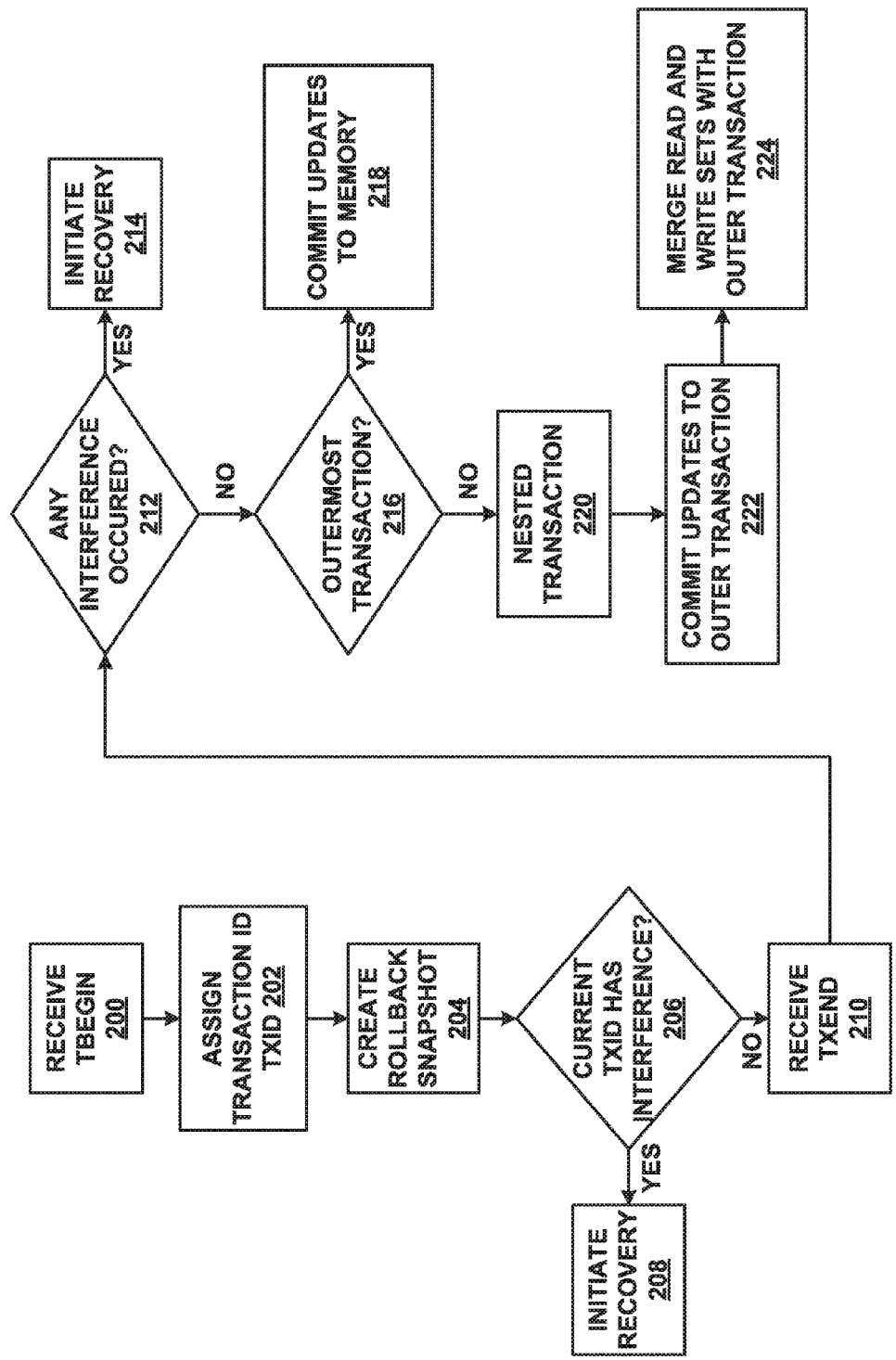
FIG. 2 depicts a flowchart for assigning transaction IDs and associating rollback information that is recovered in the event of interference in a nested transaction system, according to various embodiments.

FIG. 2 depicts the steps of a process for executing a single transaction and assigning transaction IDs and associating rollback information that may be recovered in the event of interference in a nested transaction system, according to various embodiments.

In operation 200, the CPU may begin a transaction when a TBEGIN instruction is received. In operation 202, the computer may assign a transaction ID (TXID) to a transaction to be processed by the computer. The TXID is assigned to the transaction and may allow the CPU to track operation steps (e.g., detecting interference with a transaction identified with said TXID, identifying speculative transaction state associated with the transaction identified with said TXID, identifying rollback snapshot state of the transaction with said TXID, identifying read and write sets if the transaction with the TXID) associated with the current transaction and rollback the current transaction if an interference occurs. In operation 204, the CPU may create a rollback snapshot of the TXID. The rollback snapshot is the state the CPU was in before the transaction began, and is used as recovery state for the computer in the event there is interference.

After creating the rollback data, the CPU may start executing the transaction. After starting the transaction, the CPU starts decoding and executing instructions of the transaction. Instructions in the transaction are decoded and prepared for execution. In at least one embodiment, instructions may be executed out of order relative to each other, and out of order relative to instructions of other transactions (with another TXID) of the same CPU. Advantageously, by associating TXIDs to transactions, and by associating TXIDs with instructions, events and storage associated to said transaction with said TXID, to identify instructions, events and storage of a transaction with the associated transaction's TXID, instructions which can cause events that must be associated with a specific transaction (e.g., memory accesses, and the TXEND instruction) may be executed out of order relative to each other. For comparison, in prior art, only a single transaction was active in a thread, so as to establish the transaction associated to instructions, storage, and events, thereby preventing instructions from nested transactions to execute out of order relative to each other, and further practically preventing the implementation of truly nested transactions due to the overhead of serializing instruction execution when starting and completing a nested transaction.

In operation 206, the CPU may determine if an interference has occurred with any active TXID and a remote request (corresponding to another transaction, or a memory access not within a transaction). If transaction interference has occurred, the computer may initiate a recovery using the rollback snapshot at operation 208 by indicating the TXID of the transaction for which the interference has occurred, and revert the transaction to the previous rollback save state. If interference has not occurred, then the CPU may execute the TEND instruction, in operation 210, to complete the transaction corresponding to the TXID.

In operation 212, the CPU determines if any interference has occurred during the execution of the present transaction. The interference may be a second interference. The second interference may be the same interference previously monitored for, or the second interference or may be a different type of interference. If the CPU detects interference, the CPU indicates the transaction associated to the interference in conjunction with the TXID (which is possible because read and write sets used to identify interference are associated to a transaction ID) and may initiate recovery using the rollback snapshot for the transaction with the reported TXID at operation 214 and revert the transaction with TXID (concurrently also invalidating any subsequent transactions) to the previous rollback save state. For example, after receiving a TEND completing of the processing of a first transaction with a first TXID, a determination may be made if the first transaction interferes with a second transaction. If the first transaction and the second transaction interfere, then recovery may be initiated.

In operation 216, if the computer does not detect an interference, then the computer may determine if the transaction is the outermost transaction. In operation 218, if the transaction is the outermost transaction, then the computer may commit the updates from the transaction to memory. The updates may change the memory. The updates to the memory may be on the same memory in the same location as where the transaction was acquired or may be in a different location on the same memory as where the transaction was acquired. In various embodiments, the updates to the memory may be in a different memory instead of the memory as where the transaction was acquired.

In operation 220, if the transaction is not the outermost transaction, the computer may classify the transaction as a nested transaction. Since the transaction is not the outermost transaction, the computer may then commit the updates of the processed transaction to the outer transaction, at operation 222. The outer transaction receives a set of updates, which would apply to the current transaction, which may be associated with the same data objects as the current TXID. For example, a stack of nested transactions may include three transactions, a first transaction, with a first TXID, a second transaction with a second TXID, and a third transaction with a third TXID. The first TXID may be the first transaction and the third TXID may be the outermost transaction with the second TXID between the first TXID and the third TXID. If the first TXID receives a TEND and includes updates, the updates may be committed to the third TXID.

In operation 224, the computer may merge the read and write sets with the outer transaction. The outer transaction may receive the updates from the current transaction, and update the read and write sets. For example, a first TXID may send updated read and write sets to an outer third transaction. The third TXID may merge the updated read and write sets from the current first transaction.

According to various embodiments with nested transactions, a nested transaction ID may not be reused until all outer transactions are completed, and at least one inner transaction ID is associated with at least one outer transaction ID. Nested transactions may include transaction that may be stored with, within, or underneath other transactions. A nested transaction is an inner transaction while a transaction that is nesting other transactions is an outer transaction. In such an embodiment, when an outer transaction is rolled back, the at least one inner transaction that has its transaction ID associated with the outer transaction's transaction ID is also rolled back. For example, nested transactions may include a stack of one or more transactions. In another embodiment, all the inner state's association with the transaction may be removed and the state is associated.

According to various embodiments, when an inner transaction is completed in a nested transaction set, the memory state may be updated to remove the inner transaction ID and associate all inner transaction IDs with the outer transaction. In one embodiment, where cache lines are associated to transaction IDs, a state machine may update the transaction IDs, e.g., by reading and writing every cache line. In another embodiment, a flash update may be provided.

In various embodiments, the nested transactions may be flattened. Flattening may include combining each individual transaction into a single transaction. The flattened transaction may then be processed by the computer and outputted as a single transaction.

Figure 3:
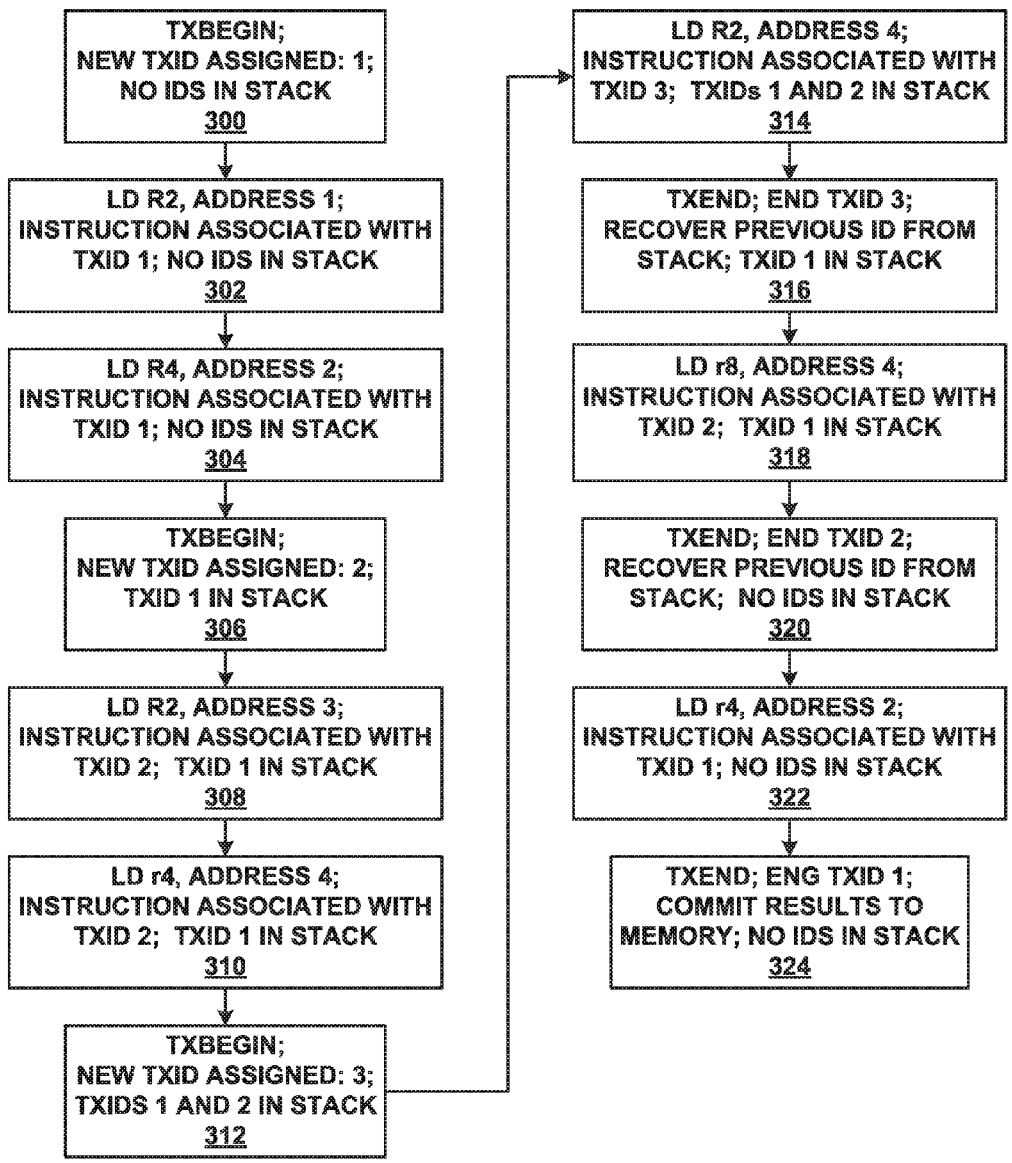
FIG. 3 depicts a flowchart of an operation of a push down stack, according to various embodiments.

FIG. 3 depicts example steps in the operation of a push down stack, according to various embodiments. The computer may begin a first transaction and assigns it a first transaction identification (TXID 1) at operation 300. At operation 300, there are no TXIDs stored in the push down stack. The computer begins to execute the first transaction, and all instructions associated with that transaction at operation 302. At operation 302, there are no TXIDs stored in the push down stack. The computer continues to execute the first transaction, and all instructions associated with that transaction at a different address at operation 304. At operation 304, there are no TXIDs stored in the push down stack.

The computer begins a second transaction and assigns the second transaction a second transaction identification (TXID 2) at operation 306. At operation 306, the computer stores TXID 1 in the push down stack. The computer begins to execute the second transaction, and all instructions associated with that transaction at operation 308. At operation 308, TXID 1 continues to be stored in the push down stack. The computer continues to execute the second transaction, and all instructions associated with that transaction at a different address at operation 310. At operation 310, TXID 1 continues to be stored in the push down stack.

The computer begins a third transaction and assigns the third transaction a third transaction identification (TXID 3) at operation 312. At operation 312, the computer stores TXID 2 in the push down stack with TXID 1. The computer begins to execute the third transaction, and all instructions associated with that transaction at operation 314. At operation 316, the third transaction is complete and the computer retrieves the second transaction, and all instructions associated with that transaction at operation 316.

The computer begins to execute the second transaction again, and all instructions associated with that transaction at operation 3618. At operation 318, TXID 1 is stored in the push down stack. At operation 320, the second transaction is complete and the computer retrieves the first transaction, and all instructions associated with that transaction at operation 320. At operation 320, there are no TXIDs stored in the push down stack. The computer begins to execute the first transaction again, and all instructions associated with that transaction at operation 322. At operation 322, there are no TXIDs stored in the push down stack. At operation 324, the first transaction is complete. At operation 324, there are no TXIDs stored in the push down stack.

Figure 4:
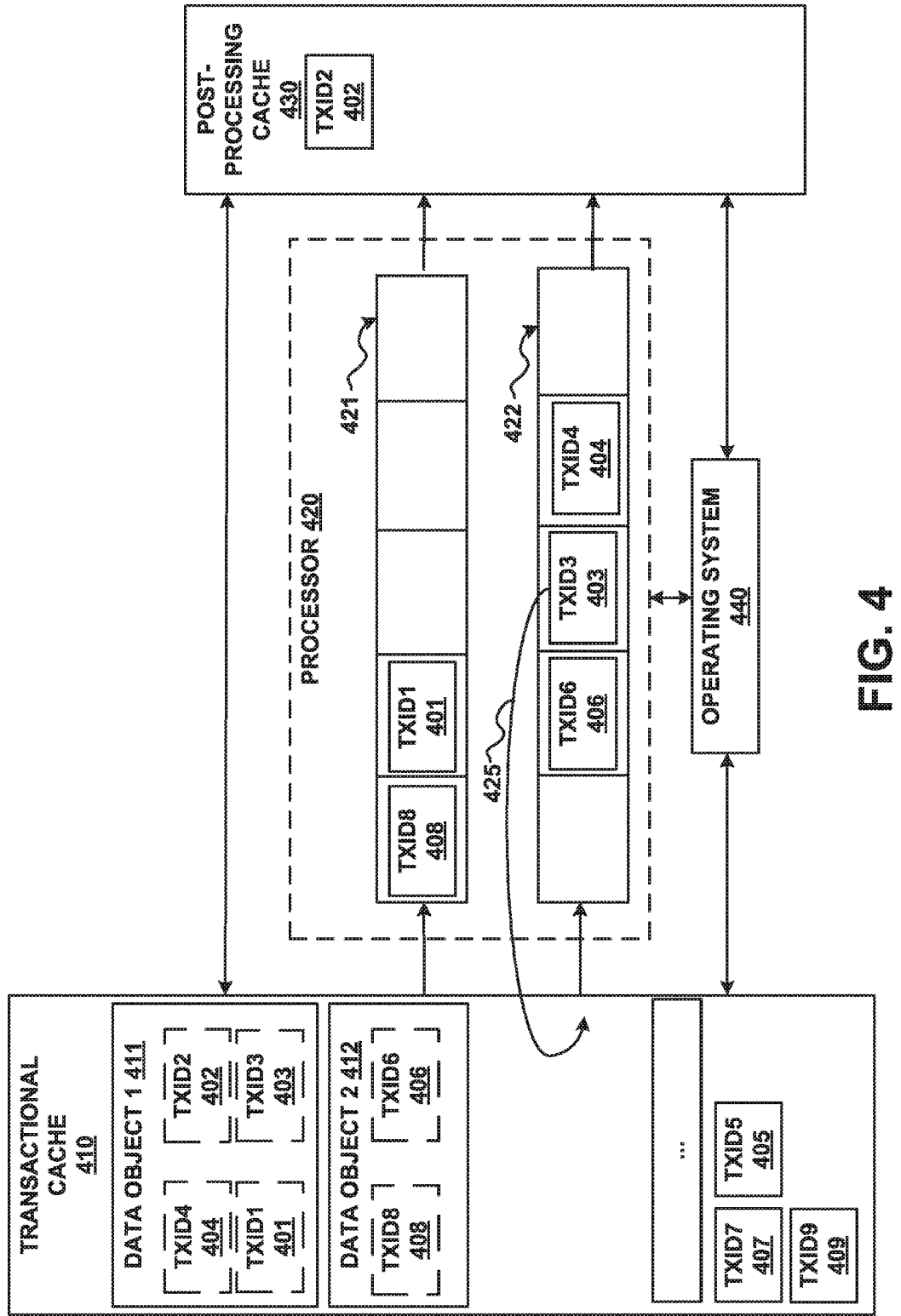
FIG. 4 depicts an execution environment of a processor wherein a rollback is initiated from an interference of transactions, according to various embodiments.

FIG. 4 depicts a transaction execution environment of a processor wherein a rollback is initiated from an interference of transactions, according to embodiments. The transaction execution environment may be communicatively coupled with an operating system (OS) 440, and may include a temporary transactional cache 410, a processor 420, and a post-processing cache (committed cache) 430. Transactions processing within the processor may be concurrently executed. The temporary transactional cache 410 may be a short term or long term storage memory that may store information or resources (data objects) or transactions until they are no longer needed or have been processed. The processor 420 may include one or more threads that process data or transactions as they are received. A first thread 421 and a second thread 422 may be included within the one or more threads of the processor 420. The OS 440 may select one or more transactions and instruct the processor 420 to process one or more transactions on the first thread 421 or the second thread 422. The post-processing cache 430 may store completed transactions or data objects that do not require additional transaction processing. The post-processing cache 430 may commit the completed transactions to a memory or a committed cache. In various embodiments, the post-processing cache 430 may communicate with the temporary transactional cache 410 or may also be the same as the temporary transactional cache 410.

The temporary transactional cache 410 may store one or more data objects including first data object (data object 1) 411, a second data object (data object 2) 412, and additional data objects depending on the temporary transactional cache 410. The temporary transactional cache 410 may also store one or more transactions. The one or more transactions may operate on the one or more data objects stored within the cache memory. For example, a first transaction 401 may operate on the first data object 411.

The processor 420 may include one or more threads. The threads may process one or more transactions sequentially. The transactions may move from a first position on the thread to a second position on the thread during operation. The positions of transactions on the threads may be illustrated as a position of the transaction compared to other transactions, as a time of processing, or a number or operations performed on the transaction. For example, the processing of the first transaction 401 may be 30% completed on the first thread 421.

The post-processing cache 430 may include one or more transactions that have completed processing on the processor 420. The completion of a processing of a transaction may be termed as a commit when writing to the post processing cache 430. Transactions that are completed and committed to the post-processing cache 430 may update the data object that the transaction was operating on. The post-processing cache 430 may store the updated information of the data object, which a transaction has edited. The post-processing cache 430 may communicate with the temporary transactional cache 410 updating and modifying the data objects upon completion of the transactions.

The transactions may be concurrently executed such that one or more transactions are processing within a processor 420. The concurrent execution may also include one or more transaction processing on a single thread of the processor 420. For example, a first transaction may be assigned a first transaction identification number (TXID1) 401 may begin processing on a first thread 421 of a processor 420. During the processing of the first transaction 401, a subsequent transaction may begin processing on the first thread 421 of the processor 420. The subsequent transaction may be an eighth transaction which is assigned an eighth transaction identification number (TXID8) 408, and be processed in conjunction with the first transaction 401 on the first thread 421. Concurrent execution of transactions within a processor may be illustrated in FIG. 4 with the following exemplary explanation of a transactional execution environment. The following exemplary transactional execution environment is for example purposes only and may not fully encompass every form and function of a transactional execution environment.

An exemplary transaction execution environment is illustrated in FIG. 4. The exemplary transaction execution environment may include a temporary transactional cache 410. The temporary transactional cache 410 may include one or more data objects including a first data object 411, and a second data object 412. The temporary transactional cache 410 may also store one or more transactions and receive instructions from the OS 440 to send the one or more transactions to the processor 420. The one or more transactions may be assigned transaction identification numbers (TXIDs) so the one or more transactions may be tracked individually within the execution environment. The one or more transactions may include, a first transaction (TXID1) 401, a second transaction (TXID2) 402, a third transaction (TXID3) 403, a fourth transaction (TXID4) 404, a fifth transaction (TXID5) 405, a sixth transaction (TXID6) 406, a seventh transaction (TXID7) 407, an eighth transaction (TXID8) 408, and a ninth transaction (TXID9) 409. The temporary transactional cache 410 may be storing one or more transactions that are to be processed on the processor 420. The TXID7 407, TXID5 405, and TXID9 409 may be stored within the temporary transactional cache 410 and wait to be processed. Each of the one or more transactions may be modifying the one or more data objects within the temporary transactional cache 410. For example, the first transaction 401 and the third transaction 403 may be modifying the first data object 411, and the eighth transaction may be modifying the second data object 412.

The exemplary transaction execution environment includes a processor 420. The processor 420 may operate upon one or more transactions. The one or more transactions may be distributed to the processor 420 from the temporary transactional cache 410 after being selected by the OS 440. The transactions may be assigned to a thread of the processor 420 to be processed, which may include one or more threads. The one or more threads may include a first thread 421 and a second thread 422, where the first thread 421 may be processing the first transaction 401 followed by the eighth transaction 408, and the second thread 422 may be processing the fourth transaction 404, followed by the third transaction 403, followed by the sixth transaction 406. Empty spaces within the one or more threads may include transactions that are not being monitored or may be empty depending on the configuration of the threads of the processor. In an example, the empty portions of the threads may include the processing power to only process two larger transactions at a time but contain the space for five smaller transactions. The first transaction 401 and the eighth transaction 408 may take up all of the processing power of the first thread 421.

The exemplary transaction execution environment includes the post-processing cache 430; the post-processing cache 430 may communicate with the temporary transactional cache 410. After the processor 420 completes (commits), a transaction into the memory, the transaction may be stored in the post-processing cache 430 and the data object the transaction was modifying within the processor 420 may be updated. For example, upon the completion of the second transaction 402, which may be modifying the first data object 411 on the processor 420, the second transaction 402 may be sent to the post-processing cache 430 and the first data object 411 may be updated.

The interference may be determined before the final interference check at transaction end by receiving a request for a line contained in a transaction either by another transaction or by an external requestor. The interference may determine if one or more of the transactions may later interfere at an interference check. The interference check may include a determination based on an update of a memory. If one or more transactions attempt to update a memory, subsequent transactions may unintentionally overwrite data. An unintentional overwrite may include reverting a previously updated portion of data because a second transaction starts before a first transaction ends, but finishes after a second transaction ends. The second transaction may be updating a data set different from the first transaction, but may overwrite what the first transaction wrote. The interference check may be dynamically determined during a processing of one or more transactions. For example, if a first transaction 401 is a read operation upon information stored within the first data object 411, and the third transaction is attempting to perform an operation upon the information the first transaction is attempting to read, then the operation of the third transaction 403 may be aborted and rolled back 425 into the transactional cache 410. The third transaction 403 may wait within the transactional cache 410 until the first transaction has completed before restarting. If the one or more transactions may interfere, then the one or more transactions they may be rolled back. The selective rollback may include rolling back a specific selected transaction using the transaction ID to a previous rollback save state.

The exemplary transaction execution environment may include a rollback operation 425. The rollback operation may remove a transaction from the processor 420 that was detected by the interference and return the rolled back operation the cache memory. The interference rollback operation may be triggered by interferences within the processor 420 and/or temporary transactional cache 410. The interference may be determined and used to detect an interference. For example, an interference may be determined with the third transaction 403. The rolling back of the third transaction 403 with the rollback operation 425 may also rollback the sixth transaction 406 because the sixth transaction 406 follows the third transaction 403. After determining an interference, transactions following the rolled back transaction may be rolled back as well. Because the fourth transaction 404 is ahead of the third transaction 403 during the rollback operation 425 the fourth transaction 404 may be unaffected by the rollback operation. Examples of interferences are described further herein and are not meant to limit the determination of interferences but are merely used as examples of interference.

In an example, an interference may result in a rollback operation 425 of the third transaction 403 that may be determined upon the completion of the second transaction 402 when the second transaction is written into the post-processing cache 430. Upon the completion of the second transaction 402, the OS 440 may check the one or more transactions within the processor 420 may be checked to determine if one or more of the transactions may later interfere at an interference check. The second transaction 402 may have completed processing and updated the first data object 411 within the temporary transactional cache 410. The third transaction may also be operating within the processor 420 and operating on the first data object 411. Upon completion of the processing of the second transaction 402 the first data object 411 is updated, and all transactions that are operating on the first data object 411 may be detected for interference. The OS may check all of the transactions operating within the processor including the third transaction 403, which may be determined for interference. The OS 440 may detect that the third transaction 403 will interfere with the updated first data object 411. Since interference was detected for the third transaction 403, the third transaction 403 is rolled back into the temporary transactional cache 410 where the third transaction may begin anew.

In an example, an interference may be determined of the third transaction 403, where the third transaction 403 will interfere with the fourth transaction 404, which is processing on the second thread 422 of the processor 420. The third transaction 403 and the fourth transaction 404 may both be processing on the second thread 422 of the processor 420 and operating on the first data object 411 within the temporary transactional cache 410. An interference may be determined between the third transaction 403 and the fourth transaction 404. Since the fourth transaction 404 began processing before the third transaction 403, and has processed further than the third transaction 403 on the second thread 422 of the processor 420, the OS 440 may rollback the third transaction 403 into the temporary transactional cache 410 with rollback operation 425 where the third transaction 403 may begin anew. Upon a determination of interference the transaction that begins processing before the other transaction remains processing (e.g. the fourth transaction 404) while the transaction that starts after (e.g. the third transaction 403) may be rolled back.

In an example, the third transaction 403 may be determined to have inference with the first transaction 401, which is processing on the first thread 421 of the processor 420. The third transaction 403 may require the first transaction 401 to complete processing before the third transaction 403 may continue processing. The third transaction 403 may require a result generated from the completion of the first transaction 401 and then use the result of the first transaction 401 to generate another result for the third transaction 403. For example, the first transaction 401 may include adding a first number to a second number and the third transaction 403 may take the result of the first transaction 403 and add a third number. The third transaction 403 may interfere with the first transaction 401 because the third transaction 403 may not be processed until the completion of the first transaction 401. The determined interference of the third transaction 403 may rollback the third transaction 403 with the rollback operation 425. The third transaction 403 is rolled back into the temporary transactional cache 410 where the third transaction 403 may begin anew. In this example, the interference may also result with other transactions that have not yet completed. For example, the third transaction 403 may depend on a result from the fifth transaction 405.

Figure 5:
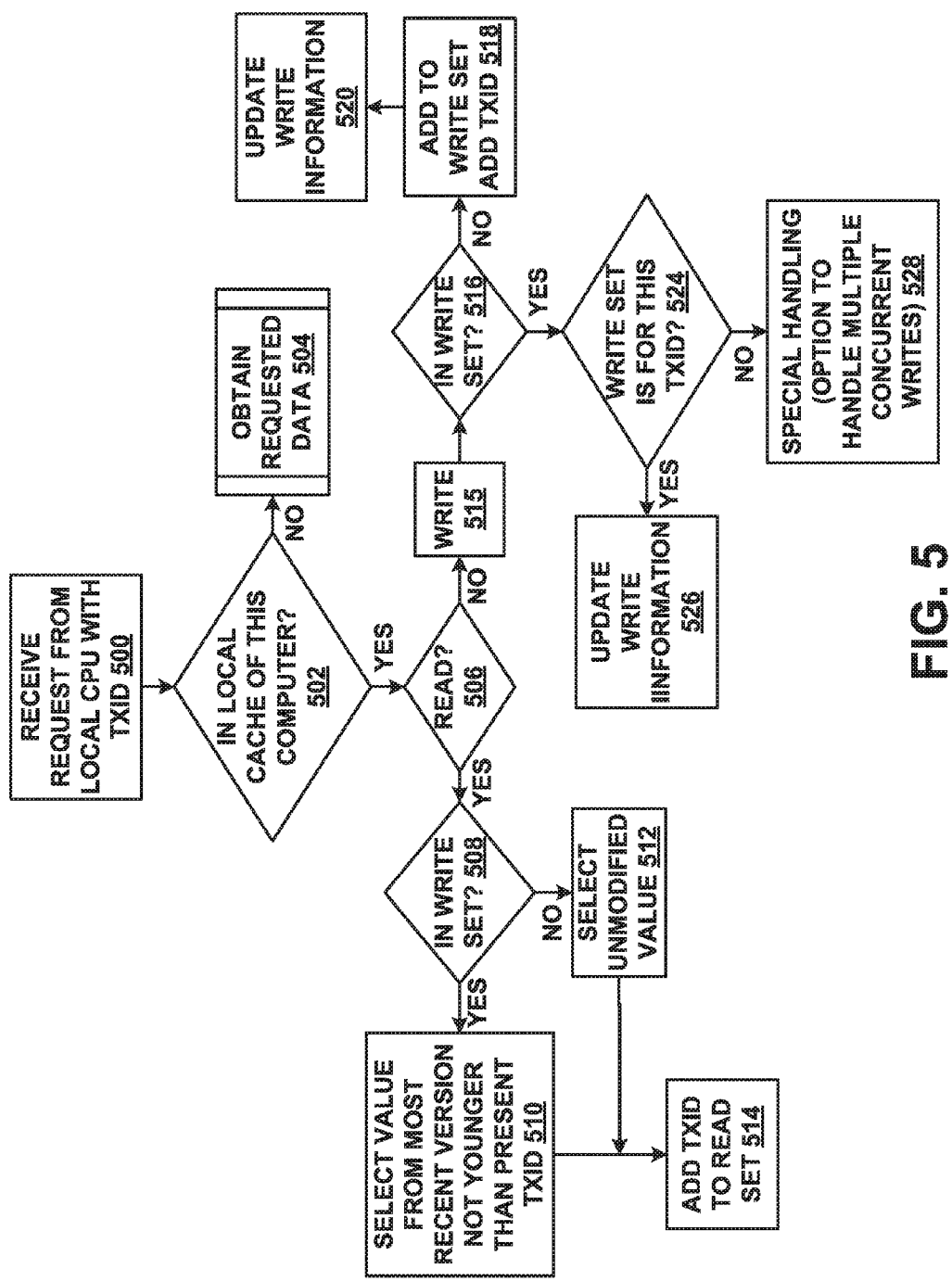
FIG. 5 depicts a flowchart for tracking an interference including a determination in response to the computer receiving a local request, according to various embodiments.

FIG. 5 depicts tracking determination in response to a computer receiving a local request at operation 500. In operation 502, the computer determines if the data is in the local cache of the computer. If the data is not located in the local cache of the computer, then the computer requests to obtain the data at operation 504. The computer requesting to obtain the data at operation 504 is further described herein in the description of remote requests.

In operation 506, if the data is located in the local cache of the computer, and then the computer determines if the request is a read request. A read request may include an operation reading the memory the transaction is stored upon. If the request is a read request, then the computer determines if the request is also in the write set at operation 508. If the request is also in the write set, then the computer selects the value from the most recent version that is not younger than the present TXID at operation 510. If the request is not also in the write set, then the computer selects the unmodified value at 512. In either the case that the request is also in the write set or in the case that the request is not in the write set, the computer adds the present TXID to the read set at operation 514.

In operation 515, if the request is not a read request, then the computer recognizes it as a write request. A write request may include an operation modifying the memory that the transaction is stored upon. The computer then determines if the request is in the write set at operation 516. If the request is not in the write set, then the computer adds the request and the present TXID to the write set at 518 and updates the write information at 520.

If the request is in the write set, the computer determines if the write set is for the TXID at 524. If the write request is not for the present TXID, then the computer has the option to handle multiple concurrent writes, which may be referred to as special handling, at operation 528. In operation 528, the special handling instructions may include determining if the write operation will interfere with a concurrent write within the multiple concurrent writes. If the write request is for the present TXID, then the computer updates the write information at operation 526.

Figure 6:
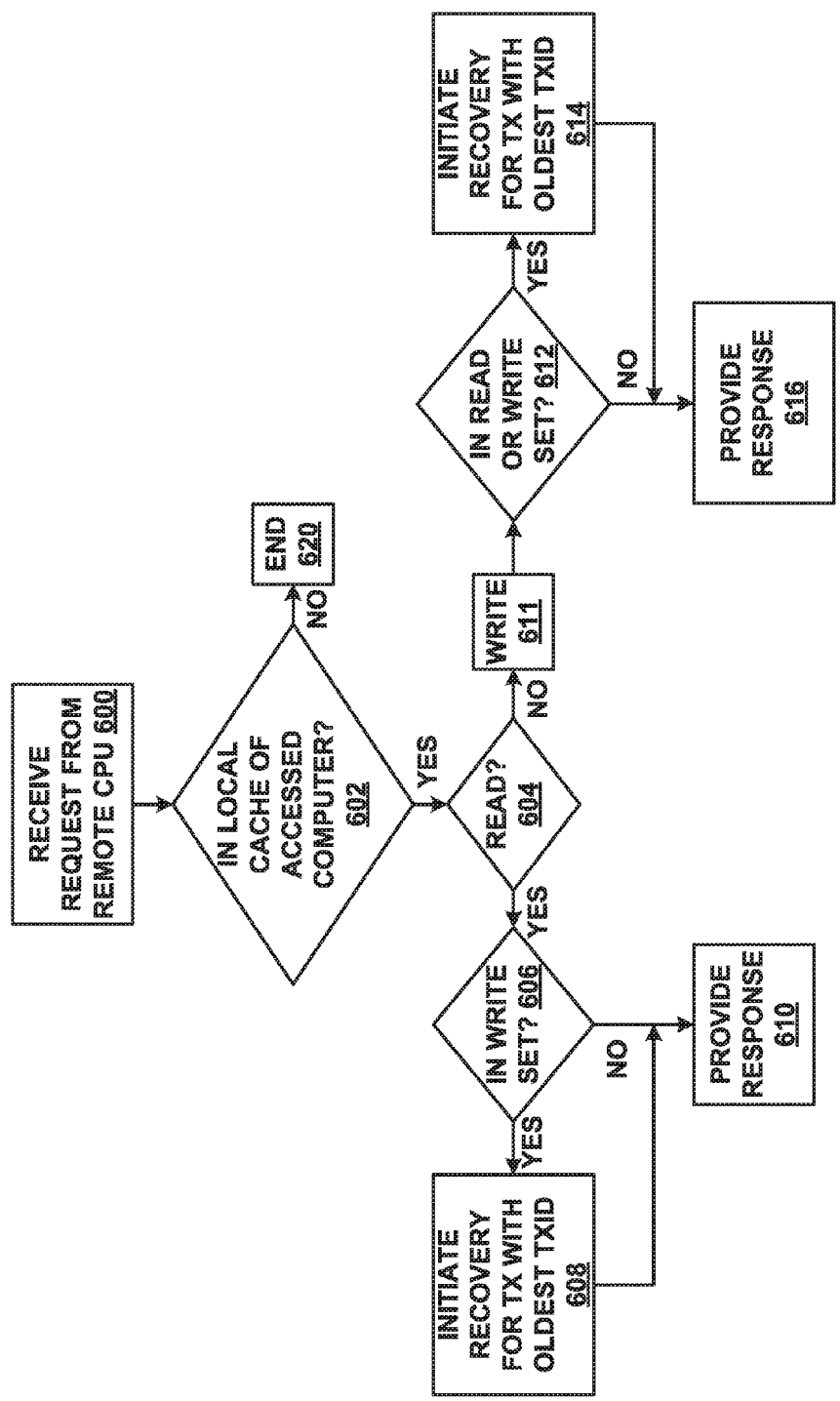
FIG. 6 depicts a flowchart for tracking an interference including a determination in response to the computer receiving a remote request, according to various embodiments.

FIG. 6 depicts tracking and interference determination in response to the computer receiving a remote request at operation 600. The computer determines if the requested data is in the local cache of the accessed computer at operation 602. If the requested data is not in the local cache for the accessed computer, then the tracking of the transaction ends at operation 620. If the requested data is in the local cache of the accessed computer, the computer then determines whether the request is a read request at operation 604.

If the request is a read request, then the computer determines if the request is also in the write set at operation 606. If the request is in the write set, then the computer initiates recovery for the transaction with the oldest TXID at operation 608, and then provides a response at operation 610. If the request is not in the write set, then computer provides a response at operation 610.

If the request is not a read request, then the computer may register the request as a write request at operation 611. If the request is a write request, then the computer determines if the request is in the read or write set operation 612. If the request is in the read or write set, then the computer initiates recovery for the transaction with the oldest TXID, at operation 614, before providing a response at operation 616. In operation 614, if the transaction is in the read or write set, the recovery may check for interference between the transaction, and current processing transactions. If the request is not in the read or write set, then computer may provide a response at operation 616.

Figure 7:
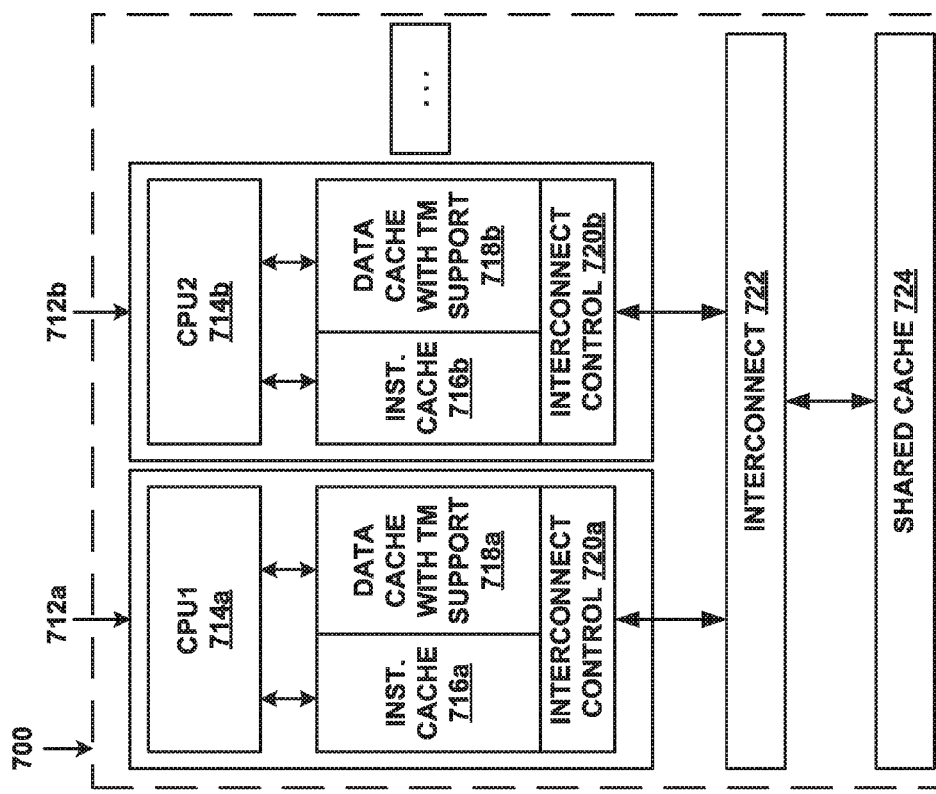
FIG. 7 depicts a plurality of TM-enabled CPUs on one die, connected with an interconnect unit, under management of an interconnect control, according to various embodiments.
Figure 8:
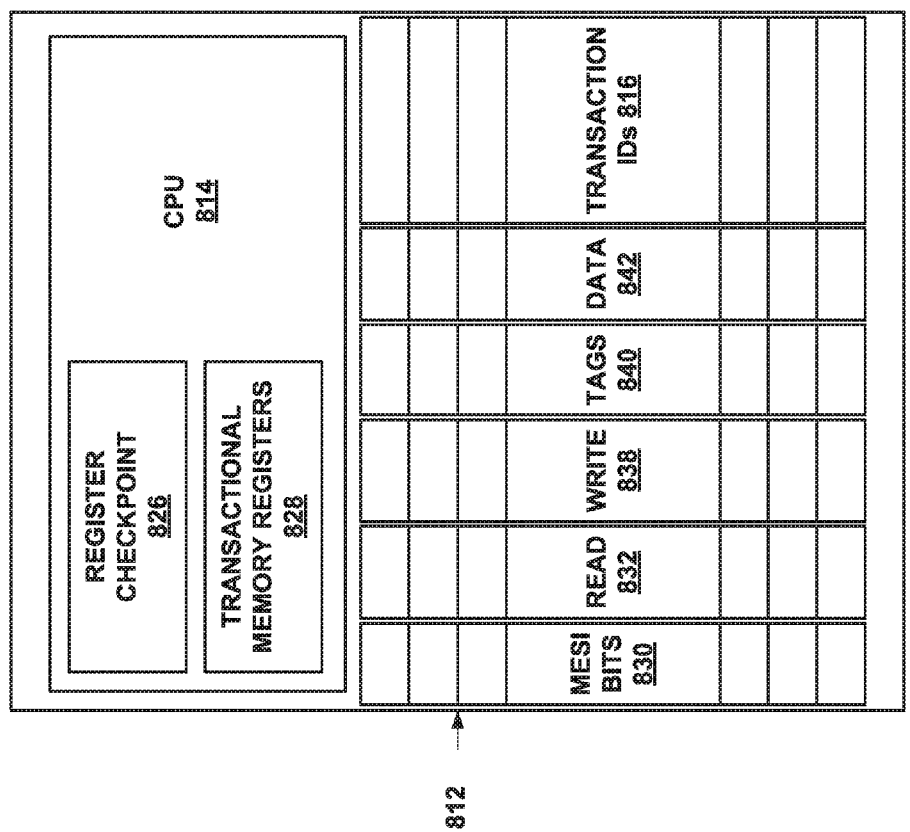
FIG. 8 depicts the details of an example transactional CPU environment, having a CPU, including additions to support TM, according to various embodiments.

FIGS. 7 and 8 depict an example of a multicore TM environment. FIG. 7 shows many TM-enabled CPUs (CPU1 714a, CPU2 714b, etc.) on one die 700, connected with an interconnect 722, under management of an interconnect control 720a, 720b. Each CPU 714a, 714b (also known as a Processor) may have a split cache consisting of an Instruction Cache 716a, 766b for caching instructions from memory to be executed and a Data Cache 718a, 718b with TM support for caching data (operands) of memory locations to be operated on by CPU 714a, 114b (in FIG. 7, each CPU 714a, 714b and its associated caches are referenced as 712a, 712b). In an implementation, caches of multiple dies 700 are interconnected to support cache coherency between the caches of the multiple dies 700. In an implementation, a single cache, rather than the split cache is employed holding both instructions and data. In implementations, the CPU caches are one level of caching in a hierarchical cache structure. For example, each die 700 may employ a shared cache 724 to be shared amongst all the CPUs on the die 700. In another implementation, each die may have access to a shared cache 724, shared amongst all the processors of all the dies 700.

FIG. 8 shows the details of an example transactional CPU environment 812, having a CPU 814, including additions to support TM. The transactional CPU (processor) 814 may include hardware for supporting Register Checkpoints 826 and special TM Registers 828. The transactional CPU cache may have the MESI bits 830, Tags 840 and Data 842 of a conventional cache but also, for example, R bits 832 showing a line has been read by the CPU 814 while executing a transaction and W bits 838 showing a line has been written-to by the CPU 814 while executing a transaction.

FIG. 8 depicts the details of an example transactional CPU environment 702, having a CPU 814, including additions to support TM. The transactional CPU 814 may include hardware for supporting register checkpoints 826 and special Transactional Memory Registers (TM Registers) 828. The transactional CPU cache may have the MESI bits

8308, tags 840, and data 842 of a conventional cache but also, for example, reading (R) bits 832 showing a line has been read by the CPU 814 while executing a transaction and write (W) bits 838 showing a line has been written-to by the CPU 814 while executing a transaction. Additionally it may have a transaction ID store 816 for various IDs that can be used during processing.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

(hence the name "eager") and, to support rollback, stores the old values of overwritten lines in an "undo log." Processors use the W 838 and R 832 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 830 state transitions (cache line indicators corresponding to Modified, Exclusive, Shared, and Invalid code states) are left mostly unchanged. Outside of a transaction, the MESI 830 state transitions are left completely unchanged. When reading a line inside a transaction, the standard coherence transitions apply (S (Shared)→S, I (Invalid)→S, or I→E (Exclusive)), issuing a load miss as needed, but the R 832 bit is also set. Likewise, writing a line applies the standard transitions (S→M, E→I, I→M), issuing a miss as needed, but also sets the W 838 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 832 (Read), they downgrade that line to S, and in certain cases issue a cache-to-cache transfer if they have the line in MESI's 830 M or E state. However, if the cache has the line W 838, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 832 or W 838, a conflict is detected.

TABLE 2

Transactional Memory Design Space
VERSIONING

| | | Lazy | Eager |
|---|---|---|---|
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a writebuffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place"

Validation: Because conflict detection is performed on every load, a transaction always has exclusive access to its own write-set. Therefore, validation does not require any additional work.

Commit: Since eager versioning stores the new version of data items in place, the commit process simply clears the W 838 and R 832 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines.

Other transactions use this address packet to detect conflicts: if an address is found in the cache and the R 832 and/or W 838 bits are set, then a conflict is initiated. If the line is found but neither R 832 nor W 838 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 838 and R 832 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 838 and R 832 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 832, writing a line sets its W bit 838, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 838 and R 832 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM® zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

| | Example Transaction Code | | |
|---|---|---|---|
| | LHI | R0,0 | *initialize retry count = 0 |
| loop | TBEGIN | | *begin transaction |
| | JNZ | abort | *go to abort code if CC1 = 0 |
| | LT | R1, lock | *load and test the fallback lock |
| | JNZ | lckbzy | *branch if lock busy |
| | ... perform operation ... | | |
| | TEND | | *end transaction |
| lckbzy | TABORT | | *abort if lock busy; this *resumes after TBEGIN |

| Example Transaction Code -continued | | | |
|---|---|---|---|
| abort | JO | fallback | *no retry if CC+323 |
| | AHI | R0, 1 | *increment retry count |
| | CIJNL | R0,6, fallback | *give up after 6 attempts |
| | PPA | R0, TX | *random delay based on retry count |
| | ... potentially wait for lock to become free ... | | |
| | J | loop | *jump back to retry fallback |
| | OBTAIN | lock | *using Compare&Swap |
| | ... perform operation ... | | |
| | RELEASE | lock | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 814 (FIG. 8) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 9:
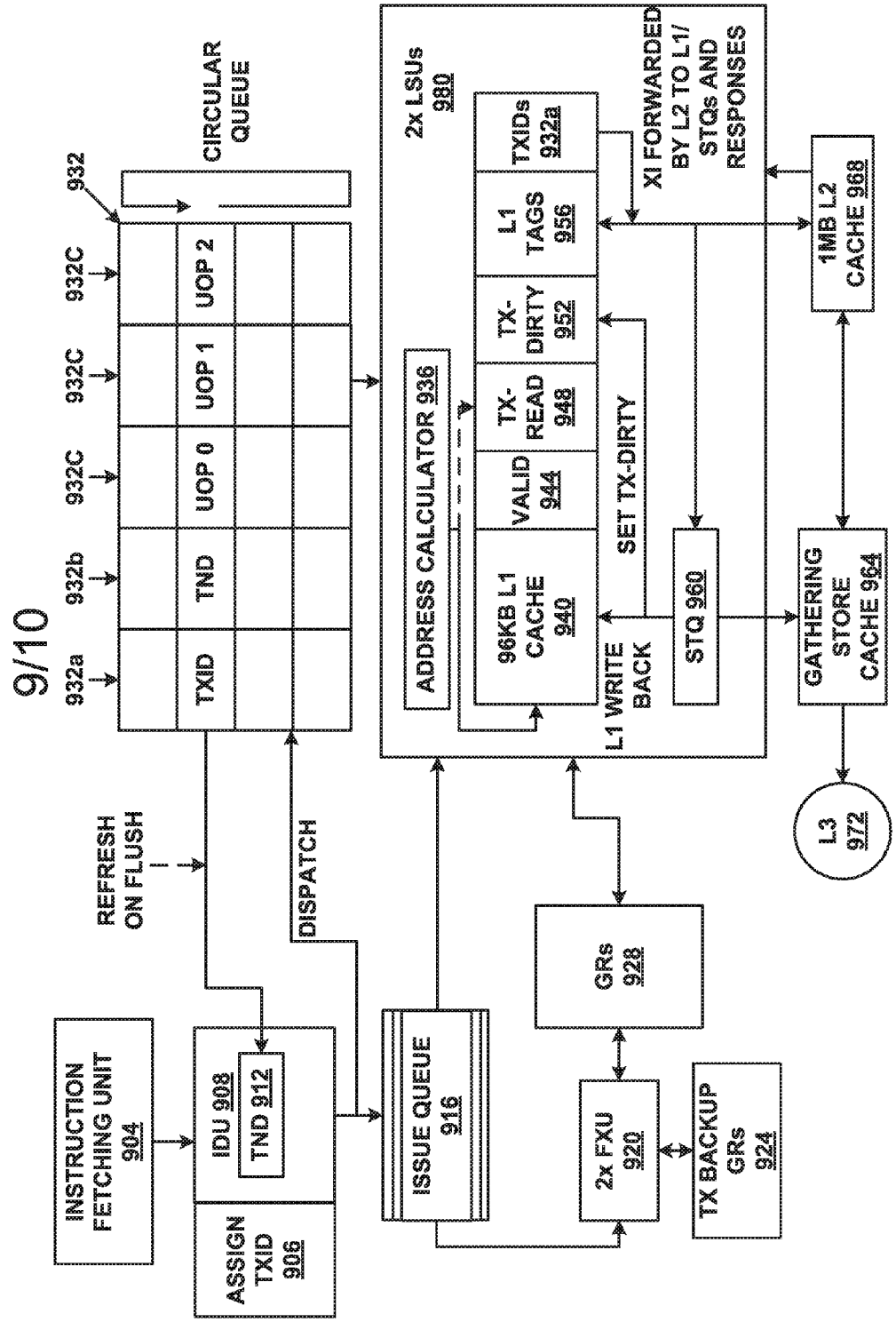
FIG. 9 depicts example components of an example transactional execution environment, including a CPU and components with which the CPU interacts, according to various embodiments.

With reference to FIG. 9, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (UOPs 932C) are written into a unified issue queue 916, from where they can be issued out-of-order. Up to two fixed-point, one floating-point, two load/store, and two branch instructions can execute every cycle. A Global Completion Table (GCT) 932 holds every micro-op 932C and a transaction nesting depth (TND) 932B. The GCT 932 is written in-order at decode time, tracks the execution status of each micro-op 932C, and completes instructions when all micro-ops 932C of the oldest instruction group have successfully executed.

After the instruction cache instruction fetching unit 904 sends a transaction to an instruction decode unit (IDU) 908, which is associated with the assign transactional ID (TXID) unit 906, which associates TXIDs with specific transactions. When the IDU 908 receives a TBEGIN instruction, the transaction nesting depth (TND) 912 is incremented, and conversely decremented on TEND instructions.

Additionally, TXID 932A may be stored or transferred from the issue queue 916. Also the TBEGIN spawns micro-ops (UOP) 932C to perform an accessibility test for a transaction diagnostic block (TDB) if one is specified; the address is saved in a special purpose register for later usage in the abort case. At the decoding of an outermost TBEGIN, the instruction address and the instruction text of the TBEGIN are also saved in special purpose registers for a potential abort processing later on.

FIG. 9 depicts example components of an example transactional execution environment, including a CPU and components with which the CPU interacts (such as those depicted in FIGS. 7 and 8). The IDU 908 keeps track of the current transaction nesting depth 912 (TND). The IDU 908 is associated with the assign transactional ID unit 906, which associates TXIDs with specific transactions. When the IDU 908 receives a TBEGIN instruction, the nesting depth 912 is incremented, and conversely decremented on TEND instructions. The nesting depth 912 is written into the GCT 932 for every dispatched instruction. When a TBEGIN or TEND is decoded on a speculative path that later gets cycled, the IDU's 908 TND 912 may be refreshed from the youngest GCT 932 entry that is not flushed. The transactional state is also written into the issue queue 916 for consumption by the execution units, mostly by the Load/Store Unit (LSU) 980, which also has an effective address calculator 936 is included in the LSU 980. The TBEGIN instruction may specify a certain TDB for recording status information, should the transaction abort before reaching a TEND instruction.

The level 1 (L1) data cache 940 is a 96 KB (kilo-byte) 6-way associative cache with 256 byte cache-lines and 4 cycle use latency, coupled to a private 1 MB (mega-byte) 8-way associative 2nd-level (L2) data cache 968 with 7 cycles use-latency penalty for L1 940 misses. The L1 940 cache is the cache closest to a processor and Ln cache is a cache at the nth level of caching. Both L1 940 and L2 968 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 940 and L2 968 are store-through and thus do not contain dirty lines. The L3 972 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 940 and L2 968 and requests the cache line from its local L3 972, the L3 972 checks whether it owns the line, and if necessary sends an XI to the currently owning L2 968/L1 940 under that L3 972 to ensure coherency, before it returns the cache line to the requestor. If the request also misses the L3 972, the L3 972 sends a request to the L4 (not shown), which enforces coherency by sending XIs to all necessary L3s under that L4, and to the neighboring L4s. Then the L4 responds to the requesting L3 which forwards the response to the L2 968/L1 940.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 940/L2 968 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected.

Transactional Instruction Execution

FIG. 9 depicts example components of an example transactional execution environment, including a CPU and caches/components with which it interacts (such as those depicted in FIGS. 7 and 8). The instruction decode unit 908 (IDU) keeps track of the current transaction nesting depth 912 (TND). When the IDU 908 receives a TBEGIN instruction, the nesting depth 912 is incremented, and conversely decremented on TEND instructions. The nesting depth 912 is written into the GCT 932 for every dispatched instruction. When a TBEGIN or TEND is decoded on a speculative path that later gets flushed, the IDU's 908 nesting depth 912 is refreshed from the youngest GCT 932 entry that is not flushed. The transactional state is also written into the issue queue 916 for consumption by the execution units, mostly by the Load/Store Unit (LSU) 980, which also has an effective address calculator 936 is included in the LSU 980. The TBEGIN instruction may specify a transaction diagnostic block (TDB) for recording status information, should the transaction abort before reaching a TEND instruction.

Similar to the nesting depth, the IDU 908/GCT 932 collaboratively track the access register/floating-point register (AR/FPR) modification masks through the transaction nest; the IDU 908 can place an abort request into the GCT 932 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 932C (including, for example UOP 0, UOP 1, and UOP 2) will be executed by one of the two fixed point units (FXUs) 920 to save a pair of GRs 928 into a special transaction-backup register file 924, that is used to later restore the GR 928 content in case of a transaction abort. Also the TBEGIN spawns micro-ops 932C to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 932C instructions; NTSTG (non-transactional store) is handled like a normal store except that it is marked as non-transactional in the issue queue 916 so that the LSU 980 can treat it appropriately. TEND is a no-op at execution time, the ending of the transaction is performed when TEND completes.

As mentioned, instructions that are within a transaction are marked as such in the issue queue 916, but otherwise execute mostly unchanged; the LSU 980 performs isolation tracking as described in the next section.

Since decoding is in-order, and since the IDU 908 keeps track of the current transactional state and writes it into the issue queue 916 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 932 at completion time. The length of transactions is not limited by the size of the GCT 932, since general purpose registers (GRs) 928 can be restored from the backup register file 924.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 980 tracks cache lines that were accessed during transactional execution, and triggers an abort if an XI from another CPU (or an LRU-XI) conflicts with the footprint. If the conflicting XI is an exclusive or demote XI, the LSU 980 rejects the XI back to the L3 972 in the hope of finishing the transaction before the L3 972 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 940 is traditionally implemented with static random access memories (SRAMs). For the transactional memory implementation, the valid bits 944 (64 rows×6 ways) of the directory have been moved into normal logic latches, and are supplemented with two more bits per cache line: the TX-read 948 and TX-dirty 952 bits.

The TX-read 948 bits are reset when a new outermost TBEGIN is decoded (which is interlocked against a prior still pending transaction). The TX-read 948 bit is set at execution time by every load instruction that is marked "transactional" in the issue queue. Note that this can lead to over-marking if speculative loads are executed, for example on a mispredicted branch path. The alternative of setting the TX-read 948 bit at load completion time was too expensive for silicon area, since multiple loads can complete at the same time, requiring many read-ports on the load-queue.

Stores execute the same way as in non-transactional mode, but a transaction mark is placed in the store queue (STQ) 960 entry of the store instruction. At write-back time, when the data from the STQ 960 is written into the L1 940, the TX-dirty bit 952 in the L1-directory 956 is set for the written cache line. The TXID 932A may be stored or maintained within the GCT 932. Store write-back into the L1 940 occurs only after the store instruction has completed, and at most one store is written back per cycle. Before completion and write-back, loads can access the data from the STQ 960 by means of store-forwarding; after write-back, the CPU 814 (FIG. 8) can access the speculatively updated data in the L1 940. If the transaction ends successfully, the TX-dirty bits 952 of all cache-lines are cleared, and also the TX-marks of not yet written stores are cleared in the STQ 960, effectively turning the pending stores into normal stores.

On a transaction abort, all pending transactional stores are invalidated from the STQ 960, even those already completed. All cache lines that were modified by the transaction in the L1 940, that is, have the TX-dirty bit 952 on, have their valid bits turned off, effectively removing them from the L1 940 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 940 receives an XI, L1 940 accesses the directory to check validity of the XI'ed address in the L1 940, and if the TX-read bit 948 is active on the XI'ed line and the XI is not rejected, the LSU 980 triggers an abort. When a cache line with active TX-read bit 948 is LRU'ed from the L1 940, a special LRU-extension vector remembers for each of the 64 rows of the L1 940 that a TX-read line existed on that row. Since no precise address tracking exists for the LRU extensions, any non-rejected XI that hits a valid extension row the LSU 980 triggers an abort. Providing the LRU-extension effectively increases the read footprint capability from the L1-size to the L2-size and associativity, provided no conflicts with other CPUs 114 (FIGS. 7 and 8) against the non-precise LRU-extension tracking causes aborts.

The store footprint is limited by the store cache size (the store cache is discussed in more detail below) and thus implicitly by the L2 968 size and associativity. No LRU-extension action needs to be performed when a TX-dirty 952 cache line is LRU'ed from the L1 940.

Store Cache

In prior systems, since the L1 940 and L2 968 are store-through caches, every store instruction causes an L3 972 store access; with now 6 cores per L3 972 and further improved performance of each core, the store rate for the L3 972 (and to a lesser extent for the L2 968) becomes problematic for certain workloads. In order to avoid store queuing delays, a gathering store cache 964 had to be added, that combines stores to neighboring addresses before sending them to the L3 972.

For transactional memory performance, it is acceptable to invalidate every TX-dirty 952 cache line from the L1 940 on transaction aborts, because the L2 968 cache is very close (7 cycles L1 940 miss penalty) to bring back the clean lines. However, it would be unacceptable for performance (and silicon area for tracking) to have transactional stores write the L2 968 before the transaction ends and then invalidate all dirty L2 968 cache lines on abort (or even worse on the shared L3 972).

The two problems of store bandwidth and transactional memory store handling can both be addressed with the gathering store cache 964. The cache 964 is a circular queue of 64 entries, each entry holding 128 bytes of data with byte-precise valid bits. In non-transactional operation, when a store is received from the LSU 980, the store cache 964 checks whether an entry exists for the same address, and if so gathers the new store into the existing entry. If no entry exists, a new entry is written into the queue, and if the number of free entries falls under a threshold, the oldest entries are written back to the L2 968 and L3 972 caches.

When a new outermost transaction begins, all existing entries in the store cache are marked closed so that no new stores can be gathered into them, and eviction of those entries to L2 968 and L3 972 is started. From that point on, the transactional stores coming out of the LSU 980 STQ 960 allocate new entries, or gather into existing transactional entries. The write-back of those stores into L2 968 and L3 972 is blocked, until the transaction ends successfully; at that point subsequent (post-transaction) stores can continue to gather into existing entries, until the next transaction closes those entries again.

The store cache 964 is queried on every exclusive or demote XI, and causes an XI reject if the XI compares to any active entry. If the core is not completing further instructions while continuously rejecting XIs, the transaction is aborted at a certain threshold to avoid hangs.

The LSU 980 requests a transaction abort when the store cache 964 overflows. The LSU 980 detects this condition when it tries to send a new store that cannot merge into an existing entry, and the entire store cache 964 is filled with stores from the current transaction. The store cache 964 is managed as a subset of the L2 968: while transactionally dirty lines can be evicted from the L1 940, they have to stay resident in the L2 968 throughout the transaction. The maximum store footprint is thus limited to the store cache size of 64×128 bytes, and it is also limited by the associativity of the L2 968. Since the L2 968 is 8-way associative and has 512 rows, it is typically large enough to not cause transaction aborts.

If a transaction aborts, the store cache 964 is notified and all entries holding transactional data are invalidated. The store cache 964 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 904 switches into "millicode mode" and starts fetching at the appropriate location in the millicode memory area Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 938 to restore.

The CPU 814 (FIG. 8) supports a special millicode-only instruction to read out the backup-GRs 924 and copy them into the main GRs 928. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 908 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 928. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 814 (FIG. 8) to stop all conflicting work, retry the local transaction, before releasing the other CPUs 814 to continue normal processing. Multiple CPUs 814 must be coordinated to not cause deadlocks, so some serialization between millicode instances on different CPUs 814 is required.

Figure 10:
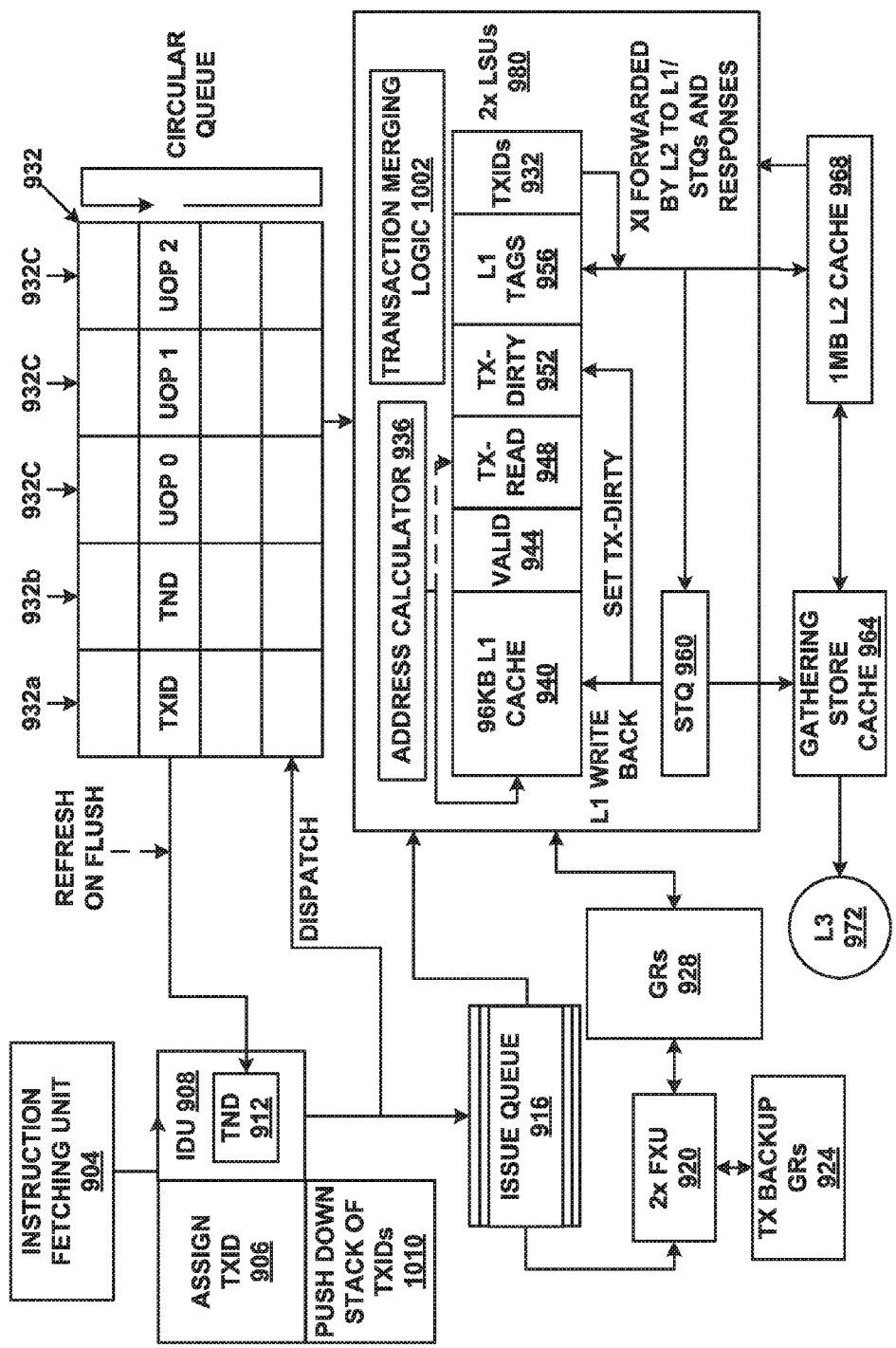
FIG. 10 depicts example components of an example transactional execution environment, including a CPU and components with which the CPU interacts, with a push down stack for nested transactions, according to various embodiments.

FIG. 10 depicts the transactional execution environment of FIG. 9 including a push down for nested transactions 1010. The transaction execution environment of FIG. 9 is illustrated in full and the components in FIG. 9 as shown in FIG. 10 may be the same or substantially similar.

The IDU 908 may assign TXIDs 906 to transactions that enter the transactional execution environment. The assignation of TXIDs 906 may include a push down stack 1010, which may store one or more nested transactions. The stored one or more nested transactions may include at least one outer transaction and may include one or more inner transactions stored below the outer transaction. The push down stack 1010 stores a nested one or more inner transactions as an outer transaction is executed. Once the outer transaction is completed, the next outermost transaction of the one or more inner transactions is removed from the push down stack 1010 and is executed on the transaction execution environment. For example, two transactions may be within the transaction execution environment, including a first transaction and a second transaction. A push down stack may be created including the inner first transaction and an outer second transaction. A third transaction may enter the transaction execution environment. The second transaction may become an inner transaction nested above the first transaction but below the outer third transaction. The third transaction may then be executed and leave the transaction execution environment.

The transaction merging logic 1002 interacts with LSU 980 to control the processing of multiple simultaneous transactions. The transaction merging logic 1002 may merge one or more transactions together. According to various embodiments, if two transactions can be merged due to how the transactions relate to a data object, then the transaction merging logic 1002 may combine the two transactions. For example, a first transaction and a second transaction may be compatible for merging due to how they relate to the data object. The second transaction may be merged on to the first transaction resulting in one transaction being processed within the LSU 980.

According to various embodiments, instructions are associated with a TXID by an instruction decode unit (not shown). In another embodiment, instructions are decoded by a decode unit, and associated with a TXID with one of an instruction dispatch, issue or sequencing unit. In one embodiment, a TXID assigned by the microprocessor assigning logic (such as decode, issue, dispatch, or sequencing unit) corresponds to the TXIDs used for tracking transaction state in one or more portions of the memory subsystem such as the L1 Cache 940, L2 cache 968, an Ln cache, or a store queue or a store buffer.

According to various embodiments, the assigned TXIDs are virtual IDs, and mapped into memory nest IDs when a TBEGIN associated with the transaction or the first instruction using the transaction ID is issued. In one aspect, a full mapping of processor and cache IDs is used, where each processor TXID can mapped to an arbitrary memory TXID. In another aspect, two sets of IDs exist, one set of physical IDs which are used by a processor and the memory nest, and a second set of virtual IDs are assigned in the processor to use for speculatively decoded instructions prior to their dispatch.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application, or technical improvement over technologies found in the marketplace, or to enable others of ordinary skill in the art to understand the embodiments disclosed herein.

The present invention may be a system, a computer implemented method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method for determining a rollback of a transaction within a transaction execution environment, the method comprising:

processing a first transaction and a second transaction on one or more threads of a transaction execution environment, wherein processing of the first transaction is assigned a first transaction identification number, processing of the second transaction is assigned a second transaction identification number, and a processor performs the processing of the first transaction and the processing of the second transaction on the one or more threads;

creating a first rollback save state of the first transaction relating the first transaction to the first transaction identification number and a second rollback save state of the second transaction relating the second transaction to the second transaction identification number;

determining that the processing of the first transaction has completed;

detecting, upon completing the processing of the first transaction and during the processing of the second transaction, an interference between completion of the first transaction and the processing of the second transaction, wherein the interference is detected prior to the second transaction entering a commit phase; and rolling back, upon detecting the interference, the second transaction to the second rollback save state.

2. The method of claim 1, wherein detecting the interference comprises:

modifying, in response to completing, a first data object;

determining that the processing of the second transaction is also modifying the first data object; and determining, in response to determining that the second transaction includes modifying the first data object, the interference that the second transaction will create with the first data object that was modified by the first transaction.

3. The method of claim 1, wherein detecting the interference comprises:

determining that the first transaction began processing before the second transaction; and determining that the first transaction and the second transaction are both modifying a first data object.

4. The method of claim 3, wherein the first transaction is processed on a first thread of a multithread processor, and the second transaction is processed on a second thread of the multithread processor.

5. The method of claim 4, further comprising:

determining that a third transaction is processing on the second thread of the processor, processing of the third transaction having started after processing of the second transaction; and rolling back the third transaction, in response to the second transaction being rolled back.

6. The method of claim 1, wherein detecting the interference comprises:
   determining that the second transaction began processing before the first transaction; and
   determining that the second transaction requires a result generated by a completion of the processing of the first transaction.

7. The method of claim 1, further comprising:
   determining that a fourth transaction is within a transactional cache, the fourth transaction being configured to modify a first data object;
   determining that the fourth transaction has not yet begun processing;
   determining that the second transaction requires a result from the fourth transaction;
   detecting a second interference between the second transaction and the fourth transaction, wherein the second interference is detected prior to the second transaction entering a commit phase;
   aborting the second transaction from the second thread; and
   holding the processing of the second transaction until the fourth transaction is completed.

8. The method of claim 7, wherein holding the second transaction further comprises:
   returning the second transaction to a transactional cache; and
   restarting the processing of the second transaction on the second thread of the processor upon the completion of the fourth transaction.

9. A system for determining a rollback of a transaction within a transaction execution environment, the system comprising:
   a memory including one or more data objects, wherein the memory is configured to:
      store the one or more data objects, and
      store one or more sets of rollback save states; and
   a processor device communicatively coupled to the memory; and
   an operating system communicatively coupled to the processor device and the memory, wherein the operating system is configured to:
      process a first transaction and a second transaction on one or more threads of a transaction execution environment, wherein processing of the first transaction is assigned a first transaction identification number, processing of the second transaction is assigned a second transaction identification number, and a processor performs the processing of the first transaction and the processing of the second transaction on the one or more threads;
      create a first rollback save state of the first transaction relating the first transaction to the first transaction identification number and a second rollback save state of the second transaction relating the second transaction to the second transaction identification number;
      determine that the processing of the first transaction has completed;
      detect, upon completing the processing of the first transaction and during the processing of the second transaction, an interference between completion of the first transaction and the processing of the second transaction, wherein the interference is detected prior to the second transaction entering a commit phase; and
      roll back, upon detecting the interference, the second transaction to the second rollback save state.

10. The system of claim 9, wherein the processor device is a multithread processing device configured to process one or more transactions simultaneously.

11. The system of claim 9, wherein detecting the interference comprises:
   modifying, in response to completing, a first data object;
   determining that the processing of the second transaction is also modifying the first data object; and
   determining, in response to determining that the second transaction includes modifying the first data object, the interference that the second transaction will create with the first data object that was modified by the first transaction.

12. The system of claim 9, wherein detecting the interference comprises:
   determining that the first transaction began processing before the second transaction: and
   determining that the first transaction and the second transaction are both modifying a first data object.

13. The system of claim 12, wherein the operating system is further configured to:
   determine that a third transaction is processing on the second thread of the processor, processing of the third transaction having started after processing of the second transaction; and
   roll back the third transaction, in response to the second transaction being rolled back.

14. The system of claim 9, wherein detecting the interference comprises:
   determining that the second transaction began processing before the first transaction; and
   determining that the second transaction requires a result generated by a completion of the processing of the first transaction.

15. The system of claim 9, wherein the operating system is further configured to:
   determine that a fourth transaction is within a transactional cache, the fourth transaction being configured to modify a first data object;
   determine that the fourth transaction has not yet begun processing;
   determine that the second transaction requires a result from the fourth transaction;
   detect a second interference between the second transaction and the fourth transaction, wherein the second interference is detected prior to the second transaction entering a commit phase;
   abort the second transaction from the second thread; and
   hold the processing of the second transaction until the fourth transaction is completed.

16. The system of claim 15, wherein holding the second transaction further comprises:
   returning the second transaction to a transactional cache; and
   restarting the processing of the second transaction on the second thread of the processor upon the completion of the fourth transaction.

17. A computer program product for determining a rollback of a transaction within a transaction execution environment comprising a computer readable storage medium having a computer readable program stored therein, wherein the computer readable program, when executed on a computing device, causes the computing device to:
   process a first transaction and a second transaction on one or more threads of a transaction execution environment, wherein processing of the first transaction is assigned a first transaction identification number, processing of the second transaction is assigned a second transaction identification number, and a processor performs the processing of the first transaction and the processing of the second transaction on the one or more threads;

create a first rollback save state of the first transaction relating the first transaction to the first transaction identification number and a second rollback save state of the second transaction relating the second transaction to the second transaction identification number;

determine that the processing of the first transaction has completed;

detect, upon completing the processing of the first transaction and during the processing of the second transaction, an interference between completion of the first transaction and the processing of the second transaction, wherein the interference is detected prior to the second transaction entering a commit phase; and roll back, upon detecting the interference, the second transaction to the second rollback save state.

18. The computer program product of claim 17, wherein detecting the interference comprises:

modifying, in response to completing, a first data object;

determining that the processing of the second transaction is also modifying the first data object; and determining, in response to determining that the second transaction includes modifying the first data object, the interference that the second transaction will create with the first data object that was modified by the first transaction.

19. The computer program product of claim 17, wherein detecting the interference comprises:

determining that the first transaction began processing before the second transaction: and determining that the first transaction and the second transaction are both modifying a first data object.

20. The computer program product of claim 17, wherein detecting the interference comprises:

determining that the second transaction began processing before the first transaction; and determining that the second transaction requires a result generated by a completion of the processing of the first transaction.

\* \* \* \* \*